US008882397B2

(12) United States Patent
Vanni

(10) Patent No.: US 8,882,397 B2
(45) Date of Patent: Nov. 11, 2014

(54) METHODS FOR WATERPROOFING DEPOSITING SITES

(75) Inventor: Daniele Vanni, Cesena (IT)

(73) Assignee: Trevi S.p.A., Cesena (FC) (IT)

( * ) Notice: Subject to any disclaimer, the term of this patent is extended or adjusted under 35 U.S.C. 154(b) by 205 days.

(21) Appl. No.: 13/527,696

(22) Filed: Jun. 20, 2012

(65) Prior Publication Data

US 2012/0328368 A1    Dec. 27, 2012

(30) Foreign Application Priority Data

Jun. 23, 2011  (IT) .............................. TO2011A0551

(51) Int. Cl.
| | | |
|---|---|---|
| *E02D 15/06* | (2006.01) | |
| *E02B 3/02* | (2006.01) | |
| *E02B 3/16* | (2006.01) | |
| *E02D 17/18* | (2006.01) | |
| *B09B 1/00* | (2006.01) | |

(52) U.S. Cl.
CPC . *E02D 15/06* (2013.01); *E02B 3/02* (2013.01); *E02B 3/16* (2013.01); *E02D 17/18* (2013.01); *B09B 1/004* (2013.01)
USPC ................ 405/270; 405/17; 405/18; 405/116

(58) Field of Classification Search
USPC ........................ 405/15, 16, 17, 18, 270, 116
See application file for complete search history.

(56) References Cited

U.S. PATENT DOCUMENTS

| | | | | | |
|---|---|---|---|---|---|
| 4,199,279 | A | * | 4/1980 | Himeji et al. ................. | 405/303 |
| 4,352,590 | A | * | 10/1982 | Parker et al. .................... | 405/17 |
| 4,407,606 | A | * | 10/1983 | Larsen ............................ | 405/17 |
| 5,150,986 | A | * | 9/1992 | Rohr ............................... | 405/74 |
| 5,222,839 | A | * | 6/1993 | Ishida et al. ................. | 405/269 |
| 5,538,787 | A | * | 7/1996 | Nachtman et al. .............. | 405/17 |
| 5,775,836 | A | * | 7/1998 | Dean, Jr. ......................... | 405/17 |
| 5,897,946 | A | * | 4/1999 | Nachtman et al. .............. | 405/17 |
| 6,386,796 | B1 | * | 5/2002 | Hull ......................... | 405/128.25 |
| 6,558,081 | B2 | * | 5/2003 | Hull ............................... | 405/17 |
| 6,817,119 | B2 | * | 11/2004 | Kerfoot .......................... | 37/323 |
| 7,695,215 | B2 | * | 4/2010 | Buhr et al. ..................... | 405/17 |
| 8,287,210 | B2 | * | 10/2012 | Hornaday ............... | 405/128.45 |

FOREIGN PATENT DOCUMENTS

| | | | | |
|---|---|---|---|---|
| DE | 2829493 | A1 | 1/1980 | |
| EP | 0154951 | A2 | 9/1985 | |
| EP | 0631018 | A1 | 12/1994 | |
| JP | 04194218 | A * | 7/1992 | ............. E02D 15/06 |
| JP | 09088066 | A * | 3/1997 | ............. E02D 15/10 |

* cited by examiner

*Primary Examiner* — Frederick L Lagman
(74) *Attorney, Agent, or Firm* — Robert E. Alderson, Jr.

(57) ABSTRACT

An object of the present invention is to provide methods for laying a waterproofing layer which may be used for forming the bottom and the walls of depositing sites so as to comply, both in literal and in substantial terms, with the legal requirements. The aim is also to provide durable waterproof barriers which have a high mechanical strength, without discontinuity.

13 Claims, 2 Drawing Sheets

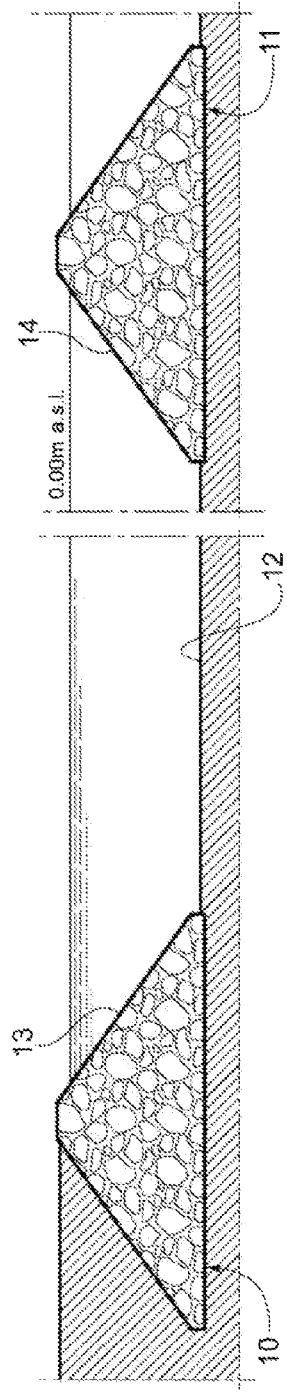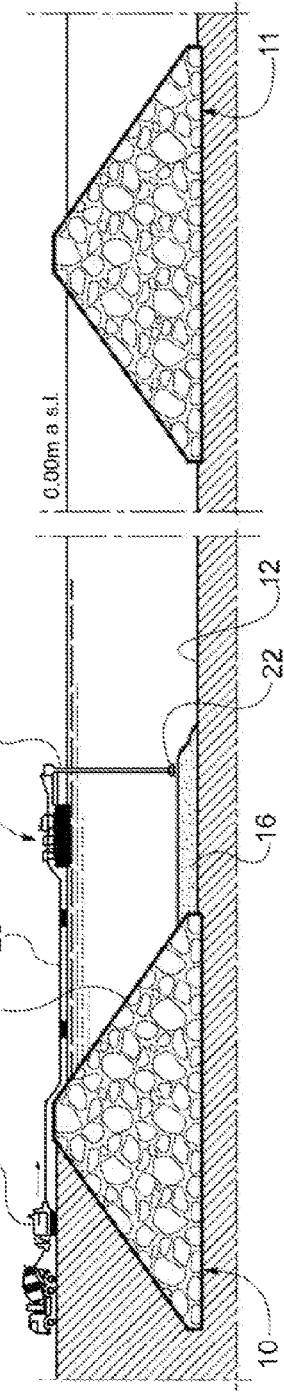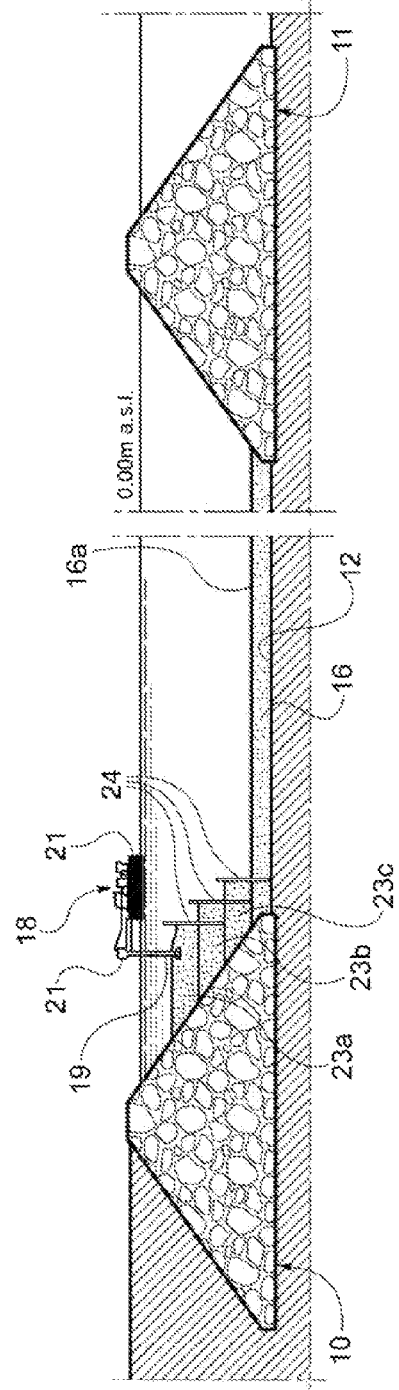

METHODS FOR WATERPROOFING DEPOSITING SITES

CROSS REFERENCE TO RELATED APPLICATION

This application claims priority to and benefit of Italian Patent Application No. TO2011A000551 filed Jun. 23, 2011, the contents of which are incorporated by reference in their entirety.

FIELD OF THE INVENTION

The present invention relates to methods for waterproofing depositing sites.

BACKGROUND OF THE INVENTION

Large basins, called depositing sites (or collection basins or containment structures), are built in the vicinity of coastal zones for the purpose of containing the materials resulting from dredging and reclamation activities.

Legislation in many countries regulate activities associated with dredging and reclamation. For example, current legislation in Italy governing the performance requisites for depositing sites (Law No. 84 dated 28 Jan. 1994, as updated by Law No. 296 dated 27 Dec. 2006, Art. 1, par. 996 and 997), stipulates that depositing sites must have a natural or artificially constructed waterproofing system around the perimeter and on the bottom, able to ensure given permeability characteristics at least equivalent to: K (permeability or hydraulic conductivity coefficient)$\leq 1.0 \times 10^{-9}$ m/s and thickness greater than or equal to 1 m. Owing to the difficulty of constructing a waterproofing layer satisfying the aforementioned minimum requirements with regard to thickness, it is considered in some cases that the aforementioned legislation might be complied with by simply laying waterproof geomembranes with an overall thickness of a few centimeters, which, while having waterproofing characteristics which comply with the minimum requirements, are less reliable.

SUMMARY OF THE INVENTION

An object of the present invention is to provide methods for laying a waterproofing layer which may be used for forming the bottom and the walls of depositing sites so as to comply, both in literal and in substantial terms, with the legal requirements. The aim is also to provide durable waterproof barriers which have a high mechanical strength, without discontinuity.

This object, together with other objects and advantages, which will be understood more clearly below, are achieved by methods having the characteristic features defined in the accompanying claims.

BRIEF DESCRIPTION OF THE FIGURES

FIG. 1 shows a schematic vertically sectioned view of a depositing site bounded by levees.

FIG. 2 shows a step for construction of a waterproofing bottom sealing layer which is cast on the natural bed of the depositing site shown in FIG. 1.

FIG. 3 shows a step for construction of a waterproofing lining on one of the levees of the depositing site shown in FIG. 1.

DETAILED DESCRIPTION

Figure 4:
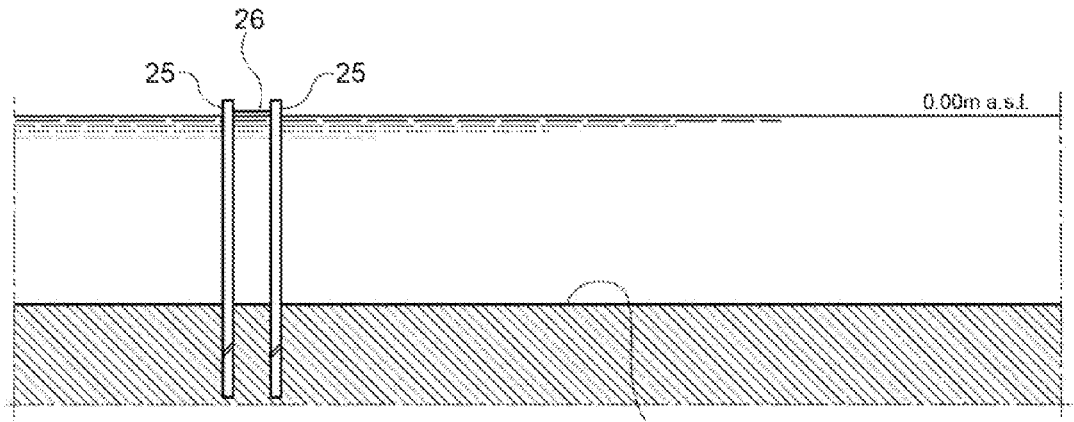
FIGS. 4 and 5 show a schematic vertically sectioned view of two successive steps during the construction of a concrete waterproofing barrier between a double sheet piling.

With reference initially to FIG. 1, a depositing site which is to be waterproofed is bounded by perimetral levees or embankments (in FIG. 1 two opposite levees 10, 11 are shown) and has a submerged natural bed 12. The waterproofing should be performed both on the bed and on the inner sidewalls of the levees, i.e. the sloping walls 13, 14 of the levees. The top of the levees should project a few meters above the surface of the water, for example 2 meters; the height of the levees may vary and generally will not be substantially greater than 12-15 meters. The slope of the sidewalls depends on the consistency of the material forming the levees. If the latter are made incorporating boulders or rocks, the slope may be about 1:1. On the other hand, depending on the particle size of the terrain forming the levees, the sidewalls may be less steep, for example 2:3 (2 meters vertically for every 3 meters horizontally). The measurements, proportions and materials forming the levees or other perimetral/lateral containment barriers of the depositing site are merely exemplary.

The natural bed of the site first should be cleaned in order to remove any large-size solid bodies, such as rocks or refuse. In the case where the terrain forming the bed is contaminated, it should be dredged. More generally, the natural bed must be rendered substantially uniform so that it is possible to form a bottom waterproof sealing layer 16 (or plate or deck) with a thickness which is as uniform as possible, cast on the natural bed.

FIG. 2 shows a step for executing, by means of underwater casting of a cement mixture or cement mixtures, the bottom waterproof sealing layer 16. In general terms the execution of this bottom sealing layer does not differ substantially from the conventional methods for providing the beds for laying the base of plinths and/or buried structures excavated under the water table, except that these have both waterproofing and structural functions.

A pumping apparatus 17, which is situated on the coast or on a vessel in the proximity of the depositing site, comprises one or more concrete pumps and sends a fluid cement mixture (or concrete) in the liquid state to a mobile structure 18 which has the function of moving one or more vertical tremie pipes 19 through which the concrete is conveyed directly onto the bed of the depositing site. As shown in the figures, the mobile structure 18 may be a so-called mobile working pontoon. The fluid concrete sent from the pumping apparatus to the pontoon may be a fluid mix or mixture of water, binders, aggregate and, preferably in certain embodiments, bentonite and suitable additives, for example fluidifying additives for reducing viscosity and ensuring more uniform casting, and anti-washing additives. The tremie pipes 19 may receive the fluid concrete mixture via one or more hoses 20 connected to the pumping apparatus 17.

In one embodiment, the mobile structure 18 may comprise a floating structure 21 which is comparable to a raft which may be guided on the surface of the water along a predetermined path. The mobile structure 18 may be associated with driving means able to move this structure along at least one predetermined path on the water surface of the depositing site in order to reach or be placed over the entire area of the bed 12 to be lined with the concrete waterproofing or sealing layer 16. In one embodiment (not shown), the said driving means may include one or more cables, for example, one or more pairs of parallel or crossed cables, to which the mobile pontoon 18 may be fastened so as to be guided along a straight path and may be equipped with one or more driving winches. The cables may be fixed to stationary or mobile fastening points along the levees or other barriers surrounding the depositing site. Alternatively, the mobile structure or pontoon 18 may take the form of a proper moving vessel which has its own engine or other propulsion system for moving the structure 18 along a path suitable for reaching the entire area of the bed 12. According to a further embodiment, the same object may be achieved by mounting the tremie pipe 19 on a wheeled vehicle able to move along the pontoon. In another embodiment, the mobile structure may take the form of a structure which is comparable to a bridge crane suspended above the water surface and provided with actuators for moving it along straight guides or rails.

The tremie pipes 19 provided on-board the pontoon may receive the mixture at a funnel-shaped top input end 21 thereof and convey it directly onto the bed. At their bottom output end 22 the tremie pipes may have a flaring or bell-shaped end portion. The tremie pipes have a length chosen depending on the depth of the bed so that the bottom opening of the pipe is located a short distance above the bed, so as to convey as much of the mixture as possible directly onto the bed. Applicants have achieved excellent results by initially resting the bottom opening of the tremie pipe directly in contact with the bed and then continuing casting by operating the bottom end of the tremie pipe immersed within the concrete which is being cast. Owing to the reaction effect of the cast material emitted, the tremie pipe continues operating in a position raised from the bed. The tremie pipe may be provided on the bottom with specific devices for favouring distribution and preventing mixing of the concrete with the mud which may be present on the bed and washing with water.

Underwater casting may be performed in accordance with a predetermined procedure. Depending on the dimensions of the bed to be lined, casting may be performed in a single step without interruption (24-hour continuous cycle) or programmed according to sectors by dividing up the surface to be cast using special separating and recording devices. The mix may be laid by means of gravity on the bed of the depositing site where it hardens, thus forming a waterproofed deck or lining which covers continuously the entire bed 12.

In order to comply with certain regulations defining performance requisites for the waterproofing of depositing sites, the bottom and sides of the site must have a thickness of at least 100 cm and be made of material with a hydraulic conductivity of $k \leq 1.0 \times 10^{-9}$ m/s. In order to provide the bottom sealing layer on a depositing site which is particularly large it may be convenient to divide up the site into modules by means of temporary sheet pilings (not shown).

The thickness of the casting may be substantially constant. The height of the bottom surface 16a of the casting, which provides an indication of the thickness of casting, may be automatically monitored, for example by means of laser or sonar detection devices.

In certain embodiments, once the bottom sealing layer 16 or the perimetral parts thereof have been completed, a procedure similar to that described above may be performed in order to provide a waterproof lining layer also on the sloping sidewalls of the levees of the depositing site (FIG. 3). In order to achieve the lateral containment effect perimetral steps 23a, 23b, 23c may be built which are arranged in an overlapping or at least partially overlapping manner. As shown in FIG. 3 the steps may be built starting from the bottom. In order to support temporarily the castings of the various steps temporary lateral containment or support elements 24 (such as formwork or sheet piling) may be used which may be fixed in the concrete of the step situated immediately below. Alternatively, lining of the sidewalls may be started forming the steps from the top of the sidewall 13 (14), fixing the support elements 24 on the levee. In certain embodiments, the temporary lateral containment/support elements 24 of the steps should not be inserted in the concrete which is freshly cast, since there is the risk of creating in it through-openings which could reduce the waterproofing seal. The number and dimensions of the steps may be variable depending on the geometrical form of the levee.

In certain embodiments, the aggregate component of the concrete cast to form the waterproofing layer may consist at least partly of dredged sediments either from adjacent port areas or coastal zones or from the natural bed of the same depositing site. According to this embodiment, the dredged sediments are conveyed firstly to a concrete-mixing plant (not shown) where they may be sorted in terms of particle size, mixed with binders, water and additives, including plasticizing and fluidifying additives, and then pumped to the working pontoon. The use of the sediments dredged in the area where the depositing site to be waterproofed is constructed, in addition to being convenient from a cost point of view, has the additional advantage of not reducing the available volume or capacity of the depositing site.

The dredged sediments may be pre-treated before being conveyed into the concrete-mixing plant, for example, by means of vibration screening or cycloning.

Figure 5:
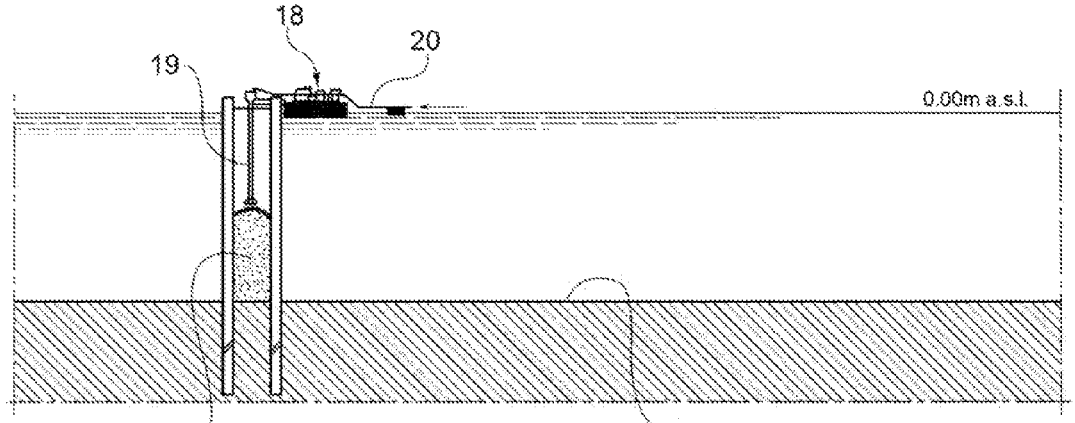
Figure 6:
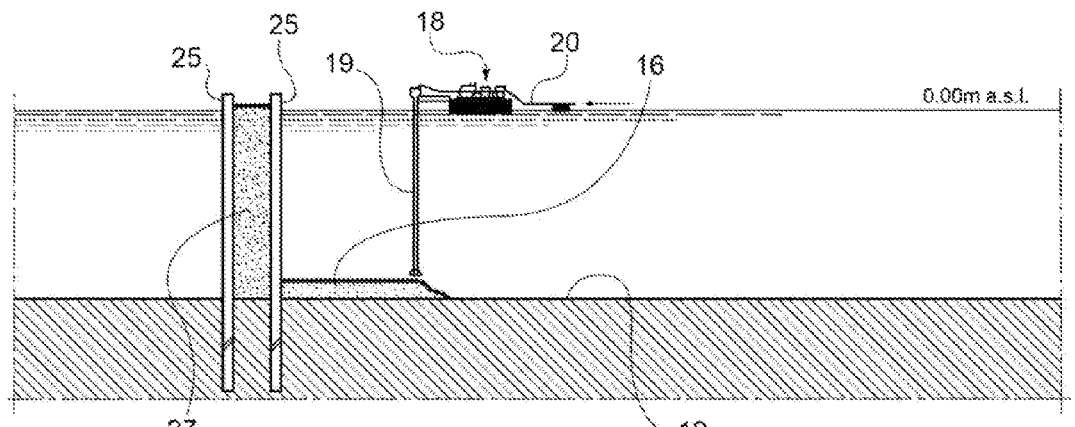
FIG. 6 shows a step for construction of a waterproofing bottom sealing layer which is cast on the natural bed of the depositing site bounded by the wall shown in FIGS. 4 and 5.

As shown in FIGS. 4 to 6, methods according to the present invention may be applied so as to waterproof a depositing site which does not have levees or embankments of the type shown in FIGS. 1 to 3. In this case the procedure adopted (FIG. 4) may include driving into the natural bed 12 a double sheet piling 25, in the form of two parallel vertical barriers which are connected by one or more ties 26 or by structural elements of another type (not shown), for example girders, along one or more perimetral sides which bound the depositing site.

The two vertical barriers may be of any form provided they are able to define a continuous internal cavity with a thickness of not less than one meter.

A mobile pontoon 18 (FIG. 5) may be used to obtain a concrete casting 27 inside the cavity between the sheet piling, thus obtaining a concrete wall. Thereafter (FIG. 6) the bottom sealing layer 16 may be cast using the same methods described above in connection with the embodiments shown in FIGS. 1 to 3. Such methods may be applied for waterproof depositing sites bounded partly by levees (FIGS. 1-3) and partly by walls cast between sheet piling (FIG. 6).

It is understood that the invention is not limited to the embodiments described and illustrated herein, which are to be regarded as examples of embodiments of the methods. The invention may be subject to modifications with regard to forms, dimensions, arrangements of parts, materials used and execution mode and times for the steps.

The invention claimed is:

1. A method for waterproofing a depositing site having a natural submerged bed, wherein the depositing site is bounded by at least one levee with at least one sloping sidewall, the method comprising the steps of:

providing, in the proximity of the depositing site, a pumping apparatus comprising at least one concrete pump;

providing a mobile supporting structure, floating on or placed over the water surface of the depositing site, having at least one vertical tremie pipe supported by the mobile structure, the tremie pipe having a top input end connected to the pumping apparatus via one or more hoses and a bottom output end;

providing a device, associated with the mobile structure and/or the tremie pipe, for moving the tremie pipe along at least one predetermined path on the water surface of the depositing site;

sending from the pumping apparatus a fluid mixture of concrete to the tremie pipe through the hose while keeping the bottom output end submerged in the water and facing the bed, and simultaneously;

moving, by said device, the mobile structure and the tremie pipe along at least one predetermined path on the water surface of the depositing site, so as to deposit on the bed a layer of concrete which continuously lines the entire bed of the depositing site, and casting on said sloping sidewall a plurality of layers of concrete in the form of steps which are at least partially overlapping and line said sloping sidewall.

2. The method of claim 1, wherein during the step of sending from the pumping apparatus a fluid mixture of concrete to the tremie pipe, the bottom output end is kept submerged in the concrete being cast.

3. The method of claim 1, wherein prior to casting the plurality of layers of concrete in the form of steps said method comprises:

fixing temporary vertical containment walls in the concrete of the step immediately below.

4. The method of claim 3, wherein the steps are built starting from the bottom and proceeding towards the top of the levee.

5. The method of claim 3, wherein the steps are built starting from the top of the levee and proceeding towards the bottom.

6. The method of claim 3, wherein prior to casting the plurality of layers of concrete in the form of steps said method comprises:

fixing temporary vertical containment walls directly in the levee.

7. The method of claim 6, wherein the steps are built starting from the bottom and proceeding towards the top of the levee.

8. The method of claim 6, wherein the steps are built starting from the top of the levee and proceeding towards the bottom.

9. The method of claim 1, wherein the fluid concrete mixture sent to the tremie pipe comprises, in the aggregate component, dredged sediments.

10. The method of claim 9, comprising the step of dredging the bed of the depositing site and including in the aggregate component of the fluid concrete mixture sent to the tremie pipe sediments dredged from the bed of the same depositing site.

11. A method for waterproofing a depositing site having a natural submerged bed, wherein the depositing site is at least partly bounded by a concrete wall the method comprising the steps of:

providing, in the proximity of the depositing site, a pumping apparatus comprising at least one concrete pump;

providing a mobile supporting structure, floating on or placed over the water surface of the depositing site, having at least one vertical tremie pipe supported by the mobile structure, the tremie pipe having a top input end connected to the pumping apparatus via one or more hoses and a bottom output end;

providing a device, associated with the mobile structure and/or the tremie pipe, for moving the tremie pipe along at least one predetermined path on the water surface of the depositing site;

sending from the pumping apparatus a fluid mixture of concrete to the tremie pipe through the hose while keeping the bottom output end submerged in the water and facing the bed, and simultaneously;

moving, by said device, the mobile structure and the tremie pipe along at least one predetermined path on the water surface of the depositing site, so as to deposit on the bed a layer of concrete which continuously lines the entire bed of the depositing site; and building said concrete wall, by driving in the bottom a double sheet piling comprising two vertical barriers defining a continuous internal cavity between them;

sending from the pumping apparatus a fluid concrete mixture to the tremie pipe through the hose, so as to fill with concrete the cavity between the sheet piling; and moving, by said device, the mobile structure and the tremie pipe alongside the sheet piling, so as to form a concrete wall.

12. The method of claim 11, wherein the fluid concrete mixture sent to the tremie pipe comprises, in the aggregate component, dredged sediments.

13. The method of claim 12, comprising the step of dredging the bed of the depositing site and including in the aggregate component of the fluid concrete mixture sent to the tremie pipe sediments dredged from the bed of the same depositing site.

* * * * *